United States Patent
Cheng et al.

(10) Patent No.: US 11,778,157 B2
(45) Date of Patent: Oct. 3, 2023

(54) IMAGE CAPTURE DEVICE AND DEPTH INFORMATION CALCULATION METHOD THEREOF

(71) Applicant: EYS3D MICROELECTRONICS, CO., Taipei (TW)

(72) Inventors: Chih-Chien Cheng, Taipei (TW); Chiao-Wen Lu, Taipei (TW); Ming-Hua Lin, Taipei (TW)

(73) Assignee: EYS3D MICROELECTRONICS, CO., Taipei (TW)

( * ) Notice: Subject to any disclaimer, the term of this patent is extended or adjusted under 35 U.S.C. 154(b) by 30 days.

(21) Appl. No.: 17/364,385

(22) Filed: Jun. 30, 2021

(65) Prior Publication Data
US 2022/0311985 A1    Sep. 29, 2022

Related U.S. Application Data

(60) Provisional application No. 63/165,743, filed on Mar. 25, 2021.

(51) Int. Cl.
*H04N 13/128* (2018.01)
*H04N 13/239* (2018.01)
*H04N 13/254* (2018.01)
*H04N 13/106* (2018.01)
*H04N 13/00* (2018.01)

(52) U.S. Cl.
CPC ......... *H04N 13/128* (2018.05); *H04N 13/106* (2018.05); *H04N 13/239* (2018.05); *H04N 13/254* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 6,023,588 A * | 2/2000 | Ray | G06T 7/593 348/E13.025 |
| 6,078,701 A * | 6/2000 | Hsu | G06T 7/32 382/284 |
| 8,269,820 B2 * | 9/2012 | Koyanagi | H04N 13/239 348/47 |
| 10,269,257 B1 * | 4/2019 | Gohl | B64C 39/024 |
| 10,917,565 B1 * | 2/2021 | Gilmour | G06F 9/30003 |
| 2005/0055139 A1 * | 3/2005 | Tanaka | B62D 15/0285 701/1 |

(Continued)

FOREIGN PATENT DOCUMENTS

TW    201817215 A    5/2018

*Primary Examiner* — Stefan Gadomski
(74) *Attorney, Agent, or Firm* — Innovation Counsel LLP

(57) ABSTRACT

The present invention discloses an image capture device and depth information calculation method thereof. The depth information calculation method includes: acquiring, a stereo camera module, an image information; and determining a re-projection mode according to a usage scenario, and transforming the image information to a depth information corresponding to the re-projection mode according to the re-projection mode. The re-projection mode is planar mode, cylinder mode or spherical mode, and the corresponding coordinate systems are planar coordinate system, cylinder coordinate system and spherical coordinate system respectively.

22 Claims, 3 Drawing Sheets

(56) References Cited

U.S. PATENT DOCUMENTS

| | | | |
|---|---|---|---|
| 2007/0009222 A1* | 1/2007 | Koo | H04N 13/395 |
| | | | 348/E13.057 |
| 2007/0211934 A1* | 9/2007 | Pan | G06V 10/24 |
| | | | 382/154 |
| 2013/0286012 A1* | 10/2013 | Medioni | G06T 17/00 |
| | | | 345/420 |
| 2015/0358612 A1* | 12/2015 | Sandrew | H04N 13/271 |
| | | | 348/47 |
| 2016/0234438 A1* | 8/2016 | Satoh | G06T 5/006 |
| 2017/0180689 A1* | 6/2017 | Morrison | H04N 9/3194 |
| 2017/0310946 A1* | 10/2017 | Ge | H04N 13/275 |
| 2018/0286067 A1* | 10/2018 | Lee | G06T 3/0062 |
| 2019/0138029 A1* | 5/2019 | Ryll | B64C 39/024 |
| 2019/0156485 A1* | 5/2019 | Pfeiffer | G06T 7/11 |
| 2019/0243360 A1* | 8/2019 | Uetani | B60Q 9/00 |
| 2020/0029025 A1* | 1/2020 | Yokota | H04N 13/243 |
| 2020/0386540 A1* | 12/2020 | Hseih | H01L 27/14605 |
| 2021/0090226 A1* | 3/2021 | Rauniyar | G06T 3/0068 |
| 2021/0183133 A1* | 6/2021 | Kaminiski | H04N 13/388 |
| 2022/0011096 A1* | 1/2022 | Morozov | G01B 11/25 |
| 2022/0020165 A1* | 1/2022 | Chen | G06T 7/514 |

\* cited by examiner

IMAGE CAPTURE DEVICE AND DEPTH INFORMATION CALCULATION METHOD THEREOF

This application claims the benefit of U.S. provisional application Ser. No. 63/165,743, filed Mar. 25, 2021, the subject matter of which is incorporated herein by reference.

BACKGROUND OF THE INVENTION

Field of the Invention

The invention relates to an image capture device and a depth information calculation method thereof.

Description of the Related Art

Stereo camera is a kind of image capture device that could catch depth information of objects and environment. The techniques used by stereo camera are, for example, time of flight (ToF), trigonometric parallax and structured light. Time-of-flight ranging is to obtain depth information by calculating the time difference between the emitted light and the arrival of the reflected light. Structured-light ranging is to project light with certain structural characteristics onto the object being photographed, and then calculate the depth information based on the collected reflected structured light pattern using the principle of triangulation. Trigonometric parallax ranging uses two linearly arranged lenses to shoot at the same time, and uses the principle of triangulation to obtain depth information. However, the traditional dual-lens camera method for calculating depth information is usually only applicable to a re-projection mode of planar mode, and cannot be applied to other non-planar modes, such as cylinder mode and spherical mode. This would make the calculation of depth information in non-planar mode use a depth information calculation method suitable for planar mode. Therefore, the calculated depth information might be wrong.

SUMMARY OF THE INVENTION

An embodiment of the present invention discloses an image capture device, comprising a stereo camera module and a processing unit. The stereo camera module is configured to acquire image information. The processing unit is coupled to the stereo camera module, and configured to determine a re-projection mode according to an operation scenario, and transform the image information to depth information corresponding to the re-projection mode according to the re-projection mode.

Another embodiment of the present invention discloses an image capture device, comprising a stereo camera module and a processing unit. The stereo camera module is configured to acquire stereo image information corresponding to a first projection mode. The processing unit is coupled to the stereo camera module, and configured to determine a re-projection mode according to an operation scenario, and transform the stereo image information to depth information corresponding to the re-projection mode according to the re-projection mode.

Yet another embodiment of the present invention discloses a depth information calculation method of image capture device, comprising: by a stereo camera module, acquiring image information; and by a processing unit, determining a re-projection mode according to an operation scenario, and transforming the stereo image information to depth information corresponding to the re-projection mode according to the re-projection mode.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
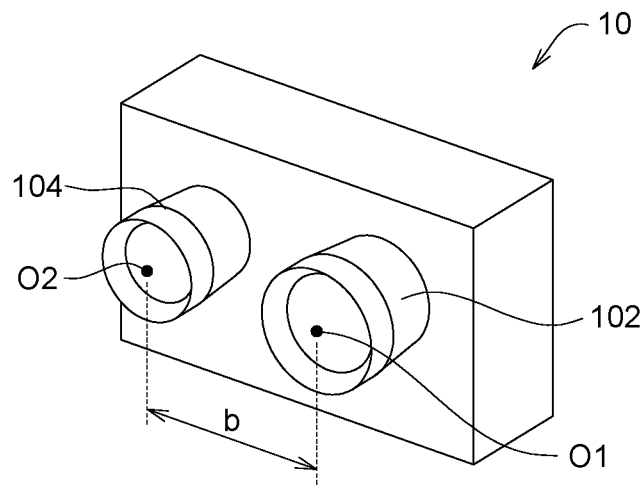
FIG. 1 shows a schematic diagram of an image capture device according to an embodiment of the present invention.

An image capture device of the present invention includes a stereo camera module and a processing unit. The stereo camera module is configured to acquire image information. The processing unit is configured to transform the image information to depth information. The hardware architecture depends on the technique applied by the image capture device. In an embodiment of structured light, the stereo camera module could include a lens for acquiring information such as color and brightness, at least one light source and at least one reflected light receiver, wherein the information acquired by the lens, the light source and the reflected light receiver is called image information. The light source could include a number of light emitting diodes, configured to generate a number of rays to form an emitted light having a specific structure. The reflected light receiver is configured to receive a reflected light with a pattern formed by a number of rays generated after the emitted light reflected by an object. The processing unit is configured to calculate depth information according to the pattern of the reflected light. In an embodiment of time-of-flight, the stereo camera module could include a lens for acquiring information such as color and brightness, at least one light source and at least one reflected light receiver, wherein the information acquired by the lens, the light source and the reflected light receiver is called image information. The light source could include a number of light emitting diodes, configured to generate an emitted light. The reflected light receiver is configured to receive a reflected light generated by the emitted light reflected by an object. The processing unit calculates depth information according to the time difference between the time of emitting the emitting light and the time of receiving the reflected light. In an embodiment of trigonometric parallax, the stereo camera module includes a first lens module and a second lens module. The first lens module and the second lens module are configured to acquire image information. The processing unit is configured to generate depth information according to the image information. No matter what ranging technique the stereo camera module uses, the processing unit may project the acquired image information to a display coordinate system corresponding to a re-projection mode according to the re-projection mode. The processing unit could determine the re-projection mode from a number of allowable modes. Each of the allowable modes corresponds to a display coordinate system. The allowable modes include, for example, planar mode and non-planar mode, wherein the non-planar mode may include cylinder mode and spherical mode. The planar mode, the cylinder mode and the spherical mode respectively correspond to planar coordinate system, cylinder coordinate system and spherical coordinate system. The coordinate system belongs to relative coordinate system, also referred as incremental coordinate system. The processing unit may determine the re-projection mode adaptively or according to the selection by a user, to make the image information to be better presented on incremental coordinate system. The embodiment of trigonometric parallax would be taken as example for further description of the present invention.

Figure 2:
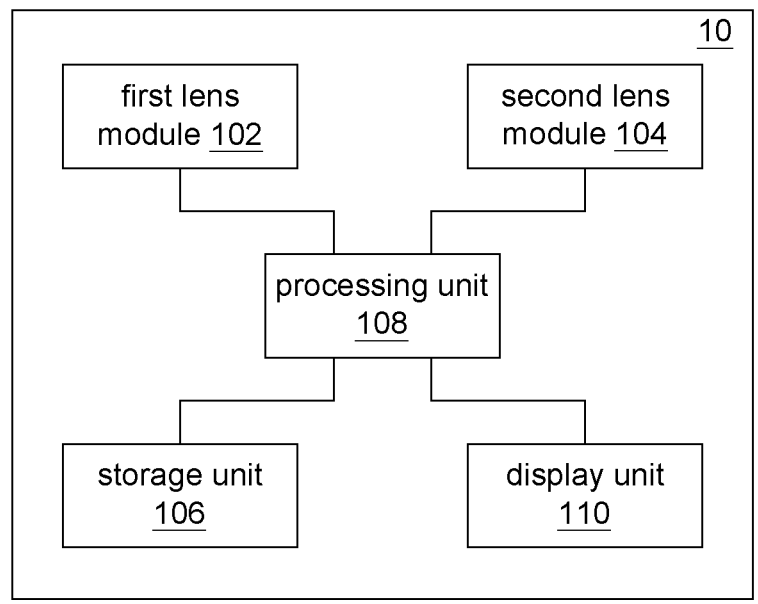
FIG. 2 shows a systematic block diagram of an image capture device according to an embodiment of the present invention.

Referring to FIGS. 1 and 2, FIG. 1 shows a schematic diagram of an image capture device according to an embodiment of the present invention, and FIG. 2 shows a systematic block diagram of the image capture device 10 in FIG. 1. This embodiment shows a stereo using trigonometric parallax ranging, which is also called binocular camera. The image capture device 10 includes a first lens module 102, a second lens module 104, a storage unit 106, a processing unit 108 and a display unit 110. The first lens module 102 is toward a first direction. The second lens module 104 is toward a second direction. In an embodiment, the first direction is substantially parallel to the second direction. The first lens module 102 has a first optical center O1. The second lens module 104 has a second optical center O2. A distance between the first optical center O1 and the second optical center O2 is defined as a distance between the first lens module 102 and the second lens module 104 (the unit is a length unit such as centimeters or inches), and hereafter would be referred as lens distance b. the first lens module 102 is configured to capture/acquire a first image. The second lens module 104 is configured to capture/acquire a second image. The first image and the second image could be the image information. The first lens module 102 and the second lens module 104 could be any suitable lens type such as fisheye lens, wide-angle lens and standard lens. In this embodiment, the first lens module 102 and the second lens module 104 are the same lens type. In an alternative embodiment, the first lens module 102 and the second lens module 104 could be different lens type.

The storage unit 106 could be non-volatile memory or a combination of non-volatile memory and volatile memory. The storage unit 106 could be configured to store firmware, metadata, image data and applications.

The processing unit 108 is coupled to the first lens module 102, the second lens module 104 and the storage unit 106. The processing unit 108 could be general purpose processor or image processing chip, for example, central processing unit (CPU) and system on chip (SoC). The processing unit 108 could include a number of integrated circuit or circuitry, and could implement the operations for running the image capture device 10 with the firmware, the metadata and the applications stored in the storage unit 106. The processing unit 108 is configured to generate a third image according to the first image and the second image, wherein the third image could be a 2D image. The processing unit 108 could further be configured to display the third image on the display unit 110 as a fourth image according to a re-projection mode. In an embodiment, the re-projection mode could be a planar mode, a cylinder mode and a spherical mode. In addition, the processing unit 108 could calculate a distance between a world coordinate point corresponding to a target point in the fourth image and the image capture device 10 (i.e., a camera position), the distance is referred as depth information. The followings would illustrate details of the operations performed by the processing unit 108.

In an embodiment, the user could manually select the re-projection mode by a user interface. In response to the selection for the re-projection mode by the user using the user interface, the processing unit 108 set the re-projection mode to the re-projection mode selected by the user, that is, one of the planar mode, the cylinder and the spherical mode. In another embodiment, the processing unit 108 determines the re-projection mode according to an operation scenario. For example, the image capture device 10 could be arranged on a vehicle, and could be coupled to a car computer by a communication unit (not shown). Through the signal communication with the car computer, the processing unit 108 could know the operation status of the vehicle (e.g., straight driving, turning and reversing), and considers the operation status of the vehicle as the operation scenario to determine the re-projection mode. For example, when the vehicle is reversing, the processing unit 108 knows that the operation status is reversing based on the signal from the car computer, and then switches the re-projection mode to the plane mode according to the operation scenario of reverse; when the processing unit 108 knows the operation status is changed from reversing to straight driving through the signal from the car computer, the processing unit 108 switches the re-projection mode from the plane mode to the cylinder mode according to the operation scenario of straight driving. The processing unit 108 could predetermine the corresponding between the operation scenario and the re-projection mode, and records the corresponding in way of hardware, firmware or software. For example, reversing corresponds to the planar mode, straight driving corresponds to the cylinder, and turning corresponds to the spherical mode. In an embodiment, it is allowable for the user to manually modify the corresponding between the operation scenario and the re-projection mode. In an embodiment, the re-projection mode could pre-set to a first projection mode, for example, the planar mode. The processing unit could switch the re-projection mode from the first projection mode to another suitable mode according to the operation scenario. At the same time, stereo image information corresponding to the first projection mode would be transformed to stereo image information corresponding to the another mode, and calculation method for depth information world change accordingly.

In other words, the switching of the re-projection mode could be performed manually by the user, or performed adaptively by the processing unit 108.

The display unit 110 is coupled to the processing unit 108. The display unit 110 could be configured to display the third image and the fourth image generated after projection. The display unit 110 could be LCD display or LED display. The invention is not limited thereto. In an alternative embodiment, the display unit is externally connected to the image capture device. That is, the image capture device could not include the display unit.

For clearly understanding the present invention, the principle of the image capture device 10 would be described firstly.

The first thing to explain is "coordinate system". A coordinate system used by the real world is generally called the world coordinate system, which belongs to "absolute coordinate system". The image capture device 10 uses the first lens module 102 and the second lens module 104 to shoot the real world to obtain the third image. A coordinate system used by the third image is herein referred as an image coordinate system, which belongs to "relative coordinate system. Mathematically, the image coordinate system and the world coordinate system could be converted to each other by a transfer function. The specific conversion method belongs to general knowledge in the art. For example, refer to the mathematical derivation about pinhole image, and would not be described herein. Based on the feature that the coordinate system and the image coordinate system could be converted to each other, a specific point/pixel in the third image could correspond to a specific world coordinate point in the would coordinate system. The fourth image is generated by the processing unit 108 projecting the third image to a display coordinate system, wherein the display coordinate system also belongs to "relative coordinate system". The display coordinate system would change according to the selected re-projection mode. As described above, the re-projection mode could be the planar mode, the cylinder mode and the spherical mode, and the corresponding display coordinate systems are respectively planar coordinate system, cylinder coordinate system and spherical coordinate system. The fourth image presented under different display coordinate systems would be visually different. Similar to the conversion between the world coordinate system and the image coordinate system, the image coordinate system and the display coordinate system could be converted to each other by corresponding transfer matrix, which belongs to general knowledge in the art and would not be described herein. In addition, different display coordinate systems could be converted to each other. For example, planar coordinate system could be converted to cylinder coordinate system; cylinder coordinate system could be converted to spherical coordinate system. That is, when the re-projection mode changes, the display coordinate system changes accordingly.

The center point of the connection line between the optical center O1 and the optical center O2 is defined as the position of the image capture device 10, i.e., the camera position. The point corresponding to the camera position in the display coordinate system is called observation point. The connection line between the optical center O1 and the optical center O2 and its extension would be defined as a base line. A line corresponding to the base line in the display coordinate system is called observation line BL.

Figure 3:
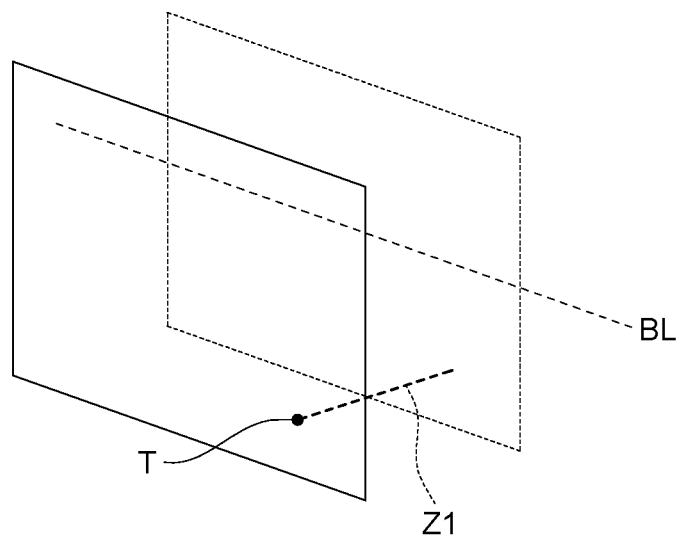
FIG. 3 shows a schematic diagram of planar mode.

Referring to FIG. 3, FIG. 3 shows a schematic diagram of the planar mode. A distance between the world coordinate point corresponding to a target point T of the fourth image under planar coordinate system and the camera position is equivalent to the vertical distance Z1 between the plane where the observation line BL is located and the plane where the target point T is located and parallel to the plane where the observation line BL is located.

Before calculating the distance Z1, the processing unit 108 may calculate a disparity parameter d corresponding to the target point T. In detail, as human eyes, the scene within the field of view (FOV) of the first lens module 102 and the second lens module 104 would be slightly different. Therefore, some parameters of the point in the first image and the point in the second image corresponding to the specific world coordinate point would be different. These parameters may include brightness, saturation, RGB value and so on. The processing unit 108 could calculate the disparity parameter corresponding to the world coordinate point by analyzing the difference of these parameters. Since the world coordinate system, the image coordinate system and the display coordinate system could be converted to each other, calculating the disparity parameter of the target point T is equivalent to calculating the disparity parameter of the world coordinate point corresponding to the target point T, and is also equivalent to calculating the disparity parameter of a third point in the third image corresponding to the target point T. Therefore, the disparity parameter of the target point could be calculated according to the difference between one or more characteristics of a first point in the first image corresponding to the target point T and a second point in the second image corresponding to the target point T. The characteristics may include brightness, saturation, RGB values, texture, edges and so on. The specific calculation method of the disparity parameter d may depend on the applied algorithm. In an embodiment, the processing unit 108 may perform image matching according to the characteristics such as texture and edge of the first image and the second image for generating the third image. When it is determined that the difference of characteristics between a point in the first image and a point in the second image is smaller than the difference of characteristics between other points in the first image and other points in the second image, these two points in the first image and the second image would be considered as corresponding to the same world coordinate point. That is, the two points would be corresponding to the same point in the third image. In this process, the disparity parameter would be calculated according to the difference of the characteristics. The unit of the obtained disparity parameter d is pixels. Noted that any algorithm for calculating the disparity parameter could be applied to the present invention.

Then, the processing unit 108 calculates the distance Z1 according to the disparity parameter d corresponding to the target point T, focal length f1 corresponding to a horizontal viewing angle (unit: pixels) and lens distance b. The horizontal viewing angle refers to the viewing angle parallel to the plane where the observation line BL is located, that is, the view angle perpendicular to the plane where the optical axis of the first lens module 102 and the optical axis of the second lens module 104 are located. The specific formula is $Z1=f1*b/d$. In an embodiment, the focal length f1 corresponding to the horizontal viewing angle could be obtained by testing and calibration before the image capture device 10 leaves factory, and could be stored in the storage unit 106 or the processing unit 108.

Figure 4:
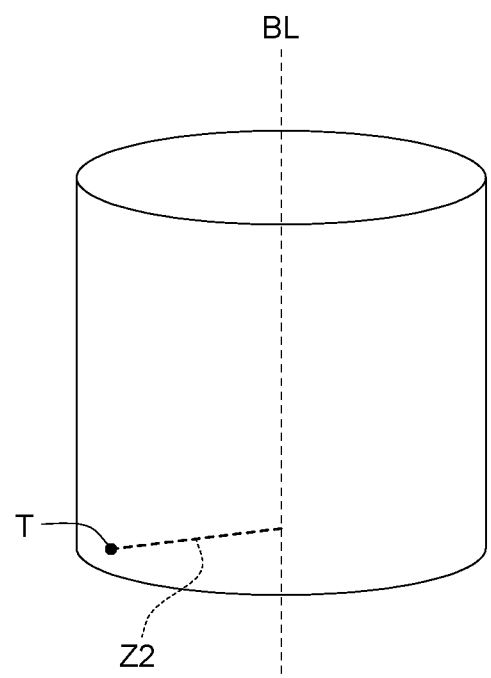
FIG. 4 shows a schematic diagram of cylinder mode.

Referring to FIG. 4, FIG. 4 shows a schematic diagram of the cylinder mode. A distance between the world coordinate point corresponding to a target point T of the fourth image under cylinder coordinate system and the camera position is equivalent to the vertical distance Z2 between the observation line BL and the cylindrical surface where the target point T is located (i.e. the radius of the cylinder), wherein the observation line BL passes through the center of the cylinder and extends axially. The processing unit 108 calculates the distance Z2 according to the disparity parameter d corresponding to the target point T, focal length f2 f1 corresponding to a vertical viewing angle (unit: pixels) and lens distance b. The horizontal viewing angle refers to the viewing angle perpendicular to the optical axis of the first lens module 102 and the optical axis of the second lens module 104. The specific formula is $Z2=f2*b/d$. in an embodiment, the focal length f2 corresponding to the horizontal viewing angle could be obtained by testing and calibration before the image capture device 10 leaves factory, and could be stored in the storage unit 106 or the processing unit 108. In an embodiment, the focal length f2 corresponding to the vertical viewing angle could be calculated by: setting the angle that the first lens module 102 reversely projected to the first image (the angle limitation allowed by the processing unit 108 is 180 degrees), and substituting the vertical angle into a formula. The formula is f2=(the width of the image resolution/2)/tan(angle setting of projection/2*180/PD, wherein the unit of the width of the image resolution is pixels, PI is circumference.

Figure 5:
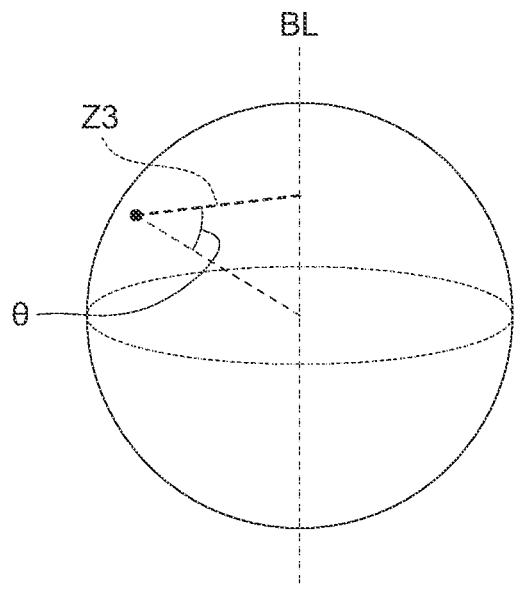
FIG. 5 shows a schematic diagram of spherical mode.

Referring to FIG. 5, FIG. 5 shows a schematic diagram of the spherical mode. A distance between the world coordinate point corresponding to a target point T of the fourth image under spherical coordinate system and the camera position is equivalent to the vertical distance Z3 between the observation line BL and the target point T, wherein the observation point is located at the center of the sphere, and the observation line BL passes through the center of the sphere and extends axially. The processing unit 108 calculates the distance Z3 according to the disparity parameter d corresponding to the target point T, a pixel to angle transfer function p2a(x), an angle θ and lens distance b, wherein the included angle θ is the angle between a vertical line between the target point T and the observation line BL and a connection line between the target point T and the observation point (the center of the sphere). The pixel to angle transfer function p2a(x) could be used to convert pixels to an angle with a specific ratio. The angle θ could be obtained by using the specific ratio of the pixel to angle transfer function. For example, if 180 degrees is arranged to 1280 pixels, the specific ratio of p2a(x) is 180/1280. Therefore, while the amount of pixels is known, multiplying the amount of pixels by 180/1280 would obtain the angle. The specific formula is Z3=b/tan(θ)−tan(θ−p2a(d)). In an embodiment, the pixel to angle transfer function could be stored in the processing unit 108 or the storage unit 106.

Based on the above description, the calculation method for depth information may include: acquiring image information by a stereo camera module; and by a processing unit, determining a re-projection mode according to an operation scenario and transforming the image information to depth information corresponding to the re-projection mode. The following would take the image capture device 10 as example to further illustration the calculation method for depth information.

Figure 6:
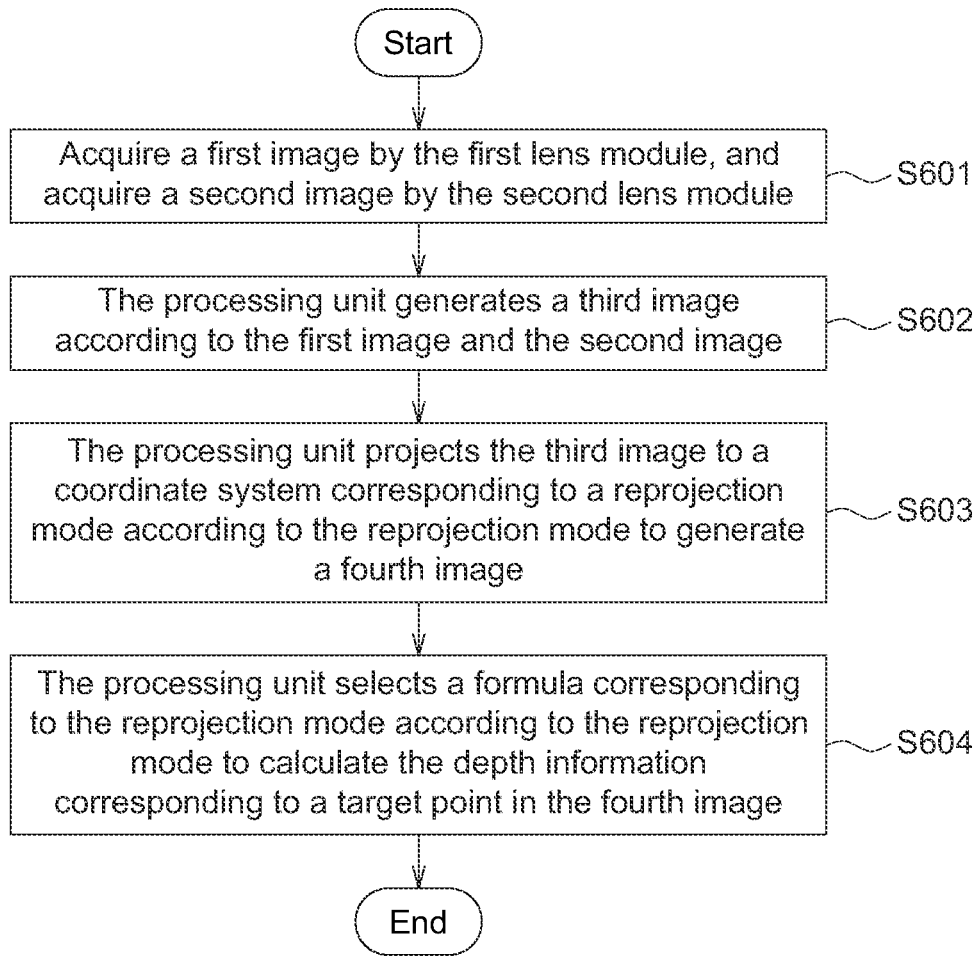
FIG. 6 shows a flowchart of a depth information calculation method of image capture device according to an embodiment of the present invention.

FIG. 6, FIG. 6 shows a flowchart of calculation method for depth information used by the image capture device according to an embodiment of the present invention. This calculation method could be performed by the image capture device 10.

At S601, acquire a first image by the first lens module, and acquire a second image by the second lens module.

At S602, the processing unit generates a third image according to the first image and the second image.

At S603, the processing unit projects the third image to a coordinate system corresponding to a re-projection mode according to the re-projection mode to generate a fourth image. The re-projection mode could be the planar mode, the cylinder or the spherical mode. The planar mode, the cylinder or the spherical mode respectively correspond to planar coordinate system, cylinder coordinate system and spherical coordinate system.

At S604, the processing unit 108 selects a formula corresponding to the re-projection mode according to the re-projection mode to calculate the depth information corresponding to a target point in the fourth image (i.e., equivalent to calculate the distance between the world coordinate point corresponding to the target point and the camera position). The specific formulas for calculating the depth information under the planar mode, the cylinder mode and the spherical mode could refer to the description of FIGS. 3, 4 and 5.

Conventionally, no matter which re-projection mode is selected, the processing unit may only use the formula for calculating depth information under the planar mode to calculate the depth information of the target point in the fourth image. This would cause the calculated depth information under non-planar mode would probably be wrong. However, with the image capture device and the depth information calculation method thereof according to the present invention, could adaptively select the formula for calculating depth information according to the re-projection mode. In this way, using the formula for the planar mode to calculate the wrong depth information under non-planar mode could be avoided.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capture device, comprising:
   a stereo camera module, configured to acquire image information; and
   a processing unit, coupled to the stereo camera module, and configured to determine a re-projection mode according to an operation scenario, and transform the image information to depth information corresponding to the re-projection mode according to the re-projection mode;
   wherein a first image and a second image are acquired by the stereo camera module, a third image is generated by the processing unit according to the first image and the second image, and the third image is projected by the processing unit to a display coordinate system corresponding to a re-projection mode according to the re-projection mode to generate a fourth image, and wherein when the re-projection mode changes, the display coordinate system changes accordingly.

2. The image capture device according to claim 1, wherein the re-projection mode is a planar mode, a cylinder mode or a spherical mode, the planar mode corresponds to planar coordinate system, the cylinder mode corresponds to cylinder coordinate system, and the spherical mode corresponds to spherical coordinate system.

3. The image capture device according to claim 2, wherein the stereo camera module comprises:
   a first lens module, configured to acquire the first image; and
   a second lens module, configured to acquire a second image.

4. The image capture device according to claim 3, wherein based on the re-projection mode is the cylinder mode, the processing unit calculates the depth information corresponding to a target point according to a disparity parameter corresponding to the target point, a lens distance and a focal length corresponding to a vertical viewing angle, the disparity parameter is calculated by the processing unit according to the difference of one or more characteristics between a first point of the first image corresponding to the target point and a second point of the second image corresponding to the target point, the lens distance is a distance between a first optical center of the first lens module and a second optical center of the second lens module.

5. The image capture device according to claim 4, wherein the depth information equals to f*b/d, f is the focal length corresponding to the vertical viewing angle, b is the lens distance and d is the disparity parameter.

6. The image capture device according to claim 3, wherein based on the re-projection mode is the spherical mode, the processing unit calculates the depth information corresponding to a target point according to a disparity parameter corresponding to the target point, a lens distance, a pixel to angle transfer function and an angle, the disparity parameter is calculated by the processing unit according to the difference of one or more characteristics between a first point of the first image corresponding to the target point and a second point of the second image corresponding to the target point, the lens distance is a distance between a first optical center of the first lens module and a second optical center of the second lens module, and the angle is an included angle between a vertical line between the target point and an observation line and a connection line between the target point and an observation point.

7. The image capture device according to claim 6, wherein the depth information equals to $b/(\tan(\theta)-\tan(\theta-p2a(d)))$, b is the lens distance, d is the disparity parameter, $\theta$ is the angle, and p2a( ) is the pixel to angle transfer function.

8. The image capture device according to claim 2, wherein the stereo camera module comprises:
  at least one light source, configured to generate an emitted light; and
  at least one lens module, each of the at least one lens module configured to acquire a first depth information of the emitted light reflected by at least one object.

9. An image capture device, comprising:
  a stereo camera module, configured to acquire stereo image information corresponding to a first projection mode; and
  a processing unit, coupled to the stereo camera module, and configured to determine a re-projection mode according to an operation scenario, and transform the stereo image information to depth information corresponding to the re-projection mode according to the re-projection mode;
  wherein a first image and a second image are acquired by the stereo camera module, a third image is generated by the processing unit according to the first image and the second image, and the third image is projected by the processing unit to a display coordinate system corresponding to a re-projection mode according to the re-projection mode to generate a fourth image, and wherein when the re-projection mode changes, the display coordinate system changes accordingly.

10. The image capture device according to claim 9, wherein the re-projection mode is a planar mode, a cylinder mode or a spherical mode, the planar mode corresponds to planar coordinate system, the cylinder mode corresponds to cylinder coordinate system, and the spherical mode corresponds to spherical coordinate system.

11. The image capture device according to claim 10, wherein based on the re-projection mode is the cylinder mode, the processing unit calculates the depth information corresponding to a target point according to a disparity parameter corresponding to the target point, a lens distance and a focal length corresponding to a vertical viewing angle, the disparity parameter is calculated by the processing unit according to the difference of one or more characteristics between a first point of the first image corresponding to the target point and a second point of the second image corresponding to the target point, the lens distance is a distance between a first optical center of a first lens module and a second optical center of a second lens module.

12. The image capture device according to claim 11, wherein the depth information equals to f*b/d, f is the focal length corresponding to the vertical viewing angle, b is the lens distance and d is the disparity parameter.

13. The image capture device according to claim 10, wherein based on the re-projection mode is the spherical mode, the processing unit calculates the depth information corresponding to a target point according to a disparity parameter corresponding to the target point, a lens distance, a pixel to angle transfer function and an angle, the disparity parameter is calculated by the processing unit according to the difference of one or more characteristics between a first point of the first image corresponding to the target point and a second point of the second image corresponding to the target point, the lens distance is a distance between a first optical center of a first lens module and a second optical center of a second lens module, and the angle is an included angle between a vertical line between the target point and an observation line and a connection line between the target point and an observation point.

14. The image capture device according to claim 13, wherein the depth information equals to $b/(\tan(\theta)-\tan(\theta-p2a(d)))$, b is the lens distance, d is the disparity parameter, a is the angle, and p2a( ) is the pixel to angle transfer function.

15. A depth information calculation method of image capture device, comprising:
  by a stereo camera module, acquiring image information; and
  by a processing unit, determining a re-projection mode according to an operation scenario, and transforming the stereo image information to depth information corresponding to the re-projection mode according to the re-projection mode;
  wherein a first image and a second image are acquired by the stereo camera module, a third image is generated by the processing unit according to the first image and the second image, and the third image is projected by the processing unit to a display coordinate system corresponding to a re-projection mode according to the re-projection mode to generate a fourth image, and wherein when the re-projection mode changes, the display coordinate system changes accordingly.

16. The depth information calculation method according to claim 15, wherein the re-projection mode is a planar mode, a cylinder mode or a spherical mode, the planar mode corresponds to planar coordinate system, the cylinder mode corresponds to cylinder coordinate system, and the spherical mode corresponds to spherical coordinate system.

17. The depth information calculation method according to claim 16, further comprising:
  by a first lens module of the stereo camera module, acquiring the first image; and
  by a second lens module of the stereo camera module, acquiring the second image.

18. The depth information calculation method according to claim 17, wherein based on the re-projection mode is the cylinder mode, the processing unit calculates the depth information corresponding to a target point according to a disparity parameter corresponding to the target point, a lens distance and a focal length corresponding to a vertical viewing angle, the disparity parameter is calculated by the processing unit according to the difference of one or more characteristics between a first point of the first image corresponding to the target point and a second point of the second image corresponding to the target point, the lens distance is a distance between a first optical center of the first lens module and a second optical center of the second lens module.

19. The depth information calculation method according to claim 18, wherein the depth information equals to f*b/d, f is the focal length corresponding to the vertical viewing angle, b is the lens distance and d is the disparity parameter.

20. The depth information calculation method according to claim 17, wherein based on the re-projection mode is the spherical mode, the processing unit calculates the depth information corresponding to a target point according to a disparity parameter corresponding to the target point, a lens distance, a pixel to angle transfer function and an angle, the disparity parameter is calculated by the processing unit according to the difference of one or more characteristics between a first point of the first image corresponding to the target point and a second point of the second image corresponding to the target point, the lens distance is a distance between a first optical center of the first lens module and a second optical center of the second lens module, and the angle is an included angle between a vertical line between the target point and an observation line and a connection line between the target point and an observation point.

21. The depth information calculation method according to claim 20, wherein the depth information equals to b/(tan(θ)−tan(θ−p2a(d))), b is the lens distance, d is the disparity parameter, θ is the angle, and p2a( ) is the pixel to angle transfer function.

22. The depth information calculation method according to claim 16, further comprising:
    by at least one light source of the stereo camera module, generating an emitted light; and
    by at least one lens module of the stereo camera module, acquiring a first depth information of the emitted light reflected by at least one object.

\* \* \* \* \*